3,557,212
ETHYL AURAMINE PROCESS
Rill Lewis Grosklos, Williamstown, W. Va., assignor to American Cyanamid Company
No Drawing. Filed Nov. 16, 1966, Ser. No. 594,668
Int. Cl. C07c 119/00
U.S. Cl. 260—566
8 Claims

ABSTRACT OF THE DISCLOSURE

The recovery of ethyl auramine from the reaction product mixture obtained by the reaction of tetraethyldiaminophenylmethane with sulfur and ammonia in the presence of urea is substantially improved by an isolation procedure characterized by the combination of (a) a "basification" step and (b) an "acid-extraction" step. The procedure may be applied either in conjunction with or to the exclusion of the conventional hot water extraction of the filter cake obtained by "drowning" and filtering the reaction product mixture.

---

This invention relates to improvements in the process for the preparation of "ethyl auramine" and more particularly to the process for obtaining ethyl auramine of improved quality in increased yields wherein the crude ethyl auramine, obtained from various chemical processes, is subjected to a basification and isolation procedure.

Auramine is a well known dye which has been of considerable commercial importance for many years. More recently, for various reasons, including objection to use of auramine as a dye for paper used in food wrapping, the ethyl homolog of auramine hereinafter referred to as "ethyl auramine" has assumed much greater importance.

As is well known "ethyl auramine" is designated by the chemical name 4,4'-imidocarbonylbis(N,N-diethylaniline)hydrochloride and is represented by the formula,

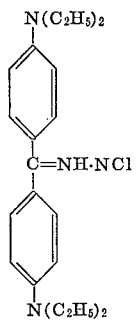

Although considerable experimentation has been performed to improve processes applicable to auramine, comparatively little attention has been given to the ethyl auramine process. Generally, the methods most commonly used for auramine are not as satisfactory for ethyl auramine.

A more recent new process for auramine, however, was also found to be applicable for obtaining useful yields of ethyl auramine. This process which is described in U.S. Pat. No. 3,132,178 is a modification of previously known methods and involves the use of urea in the reaction mixture. Another improved process for auramine using sulfamic acid and urea in the reaction is described in U.S. Pat. No. 3,268,585. This latter process is also applicable to ethyl auramine although the results are not as satisfactory from the standpoint of yield of isolatable product.

Because of the recent increased commercial importance thereof, there is a pressing need to further increase the amounts of useful ethyl auramine product. While ethyl auramine is known to be formed in substantial quantities by the aforementioned processes, a portion of the ethyl auramine is retained in the tarry residue from which the main body of product has been removed. The part of the product remaining in the tarry residue is evidently present in an insoluble form. By the methods of isolation used to date, it has not been possible to convert the insoluble form to useful soluble ethyl auramine. As a result, the total yield of useful product is deficient. Thus, yields of only 55–60% of theory are obtainable in isolatable form. It will be appreciated that from an economical standpoint, improved yields of useful product are highly desirable. It is the object of this invention to provide a new isolation procedure, whereby the yield of useful ethyl auramine product is substantially increased.

The new isolation procedure of the present invention is applicable to processes for the preparation of ethyl auramine which involves the reaction of tetraethyldiaminodiphenylmethane (also referred to as "ethyl methane base"), sulfur, urea and a source of ammonia, including ammonia gas itself, ammonium chloride, ammonium acetate or ammonium sulfamate, followed by drowning in an aqueous bath. Up to the present time, the solid materials have been isolated by filtration of the drowning mixture and then extracting the resulting "solid cake" with hot water leaving a "tarry cake." From the hot water extracts after cooling, the ethyl auramine was then precipitated, the precipitation conveniently being promoted by addition of sodium chloride and at times also by seed product.

In accordance with the present invention, it has been found that a substantially increased amount of ethyl auramine product can be recovered from the aforesaid processes by the application therein of a new isolation process, characterized by the novel combination of (a) a "basification" step and (b) an "acid-extraction" step. The new isolation procedure may be applied either in conjunction with or to the exclusion of the hot water extraction of the "solid cake" (resulting from the drowning mixture) as has been done heretofore.

Thus, in a preferred embodiment of the invention, the "solid cake" isolated from the drowning mixture is first extracted with hot water as was heretofore done and the solid product salted out from the extract. The new process improvement is then carried out on the "tarry cake" remaining after the aqueous extraction. Thus, it is advantageous to first isolate the isolatable product from the original filter cake, and then subject the residual (tarry) filter cake to the basification and acid extraction steps with subsequent precipitation of the product.

In an alternate embodiment of the invention, the "solid cake" obtained by filtration of the drowning mixture is treated (i.e., washed or contacted) with an aqueous alkaline solution of pH 10 or greater and then extracted with a dilute aqueous acid solution, the acid solution then being treated to precipitate the ethyl auramine product, preferably by salting out with sodium chloride.

In a further embodiment of the invention, rather than isolating the ethyl auramine product from the hot water extract of the filter cake from the drowning mixture, the said extract is combined with the acid extract resulting from the application of the basification and acid extraction steps, the product then being recovered from the combined extracts.

By a still further embodiment of the invention, the basification step is applied directly to the molten reaction mixture (dyemelt), followed by the acid extraction step. In other words, in this embodiment, the conventional drowning of the reaction mixture and the basification step are combined. Thus, in this instance, the drowning medium is the alkaline solution rather than water. After filtration of the drowning mixture, the acid extraction step is then applied to the resulting filter cake, the entire recoverable ethyl auramine product being precipitated from the acid extract.

Although the invention is not to be limited by any suggested explanation of the mechanism, it is likely that the treatment with the alkaline solution decomposes insoluble salts of ethyl auramine such as the thiocyanate and the cyanurate. The acidic solution then solubilizes the dye base remaining; the dye can then be isolated from the acidic solution.

As afore-indicated, the crude dye product (i.e., reaction mixture, "solid cake" or "tarry cake" as the case may be) to which the isolation process of the invention is applicable may be obtained by described processes. For example, the process involving reaction of tetraethyldiaminodiphenylmethane, sulfur, ammonium chloride and urea as shown in Example 8 of U.S. Pat. No. 3,132,178; or a process similar to that for auramine using sulfamic acid and urea, as described in U.S. Pat. No. 3,268,585. As stated above, useful yields of ethyl auramine may be obtained using the method described in the latter patent for auramine by substituting the corresponding ethyl homolog of the starting methane base. By the use of the isolation process of the invention, however, the yield of useful ethyl auramine is greatly enhanced.

A further new and advantageous feature pertains to the sulfamic acid process when it is applied to ethyl auramine which improves the yield of ethyl auramine even by the former isolation procedure. But applying the present new procedure, the yield is still further improved. This new feature involves blowing or bubbling a gas through the reaction mixture during the reaction. Good results are obtained when ammonia is used as the "bubbling gas." Thus, with the use of the "bubbling gas," the yield of ethyl auramine isolated by the original procedure increases sharply. A corresponding increase in yield is provided by the present basification process. However, a combination of the "gas bubbling" procedure with the basification procedure gives best results. Ammonia is normally used as the "bubbling gas" in the initial phase of the reaction. After using ammonia as the "bubbling gas" at the start, carbon dioxide, nitrogen or other inert gas may be used during the final stages with equivalent results.

As afore-indicated, the aqueous alkaline solution for the basification step should have a pH of at least 10. Sodium bicarbonate is not sufficiently basic to be suitable. However, alkaline materials such as sodium carbonate solution, sodium hydroxide solution, ammonium hydroxide, etc. may be used. With sodium bicarbonate there is some yield increase, but it is considerably less than when a more strongly alkaline material is used.

For the acid extraction step, any water-soluble acid may be used, either organic or inorganic, which forms a soluble salt with the ethyl auramine, but which does not cause any decomposition of the product at the concentration used. Dilute lower alkanoic acids, are preferred. For example, a solution of 10 parts acetic acid in 2000 parts water is particularly effective.

The invention is further illustrated by the examples which follow.

EXAMPLE 1

Sulfamic acid process of U.S. No. 3,268,585 using ammonia as bubbling gas

A mixture of 124 parts of ethylmethane base (tetraethyldiaminodiphenylmethane) and 300 parts of urea is heated to 120° C. with stirring under an anhydrous ammonia atmosphere. 39 parts of sulfamic acid is added and bubbling of ammonia gas through the entire mixture is started; this is continued throughout the reaction period up to the drowning step mentioned below. The mixture is then heated gradually to 155° C. (over ½ hour) and 26 parts sulfur added. After stirring one hour more at the same temperature, an additional 13-part portion of sulfur is added. After stirring 2½ hours longer at 155° C., the temperature is increased gradually to 175° C. (over a 2-hour period) and then held at that temperature for ½ hour.

The whole molten mass is then drowned in 7000 parts water at 65° C. containing 9 parts acetic acid and 75 parts of filter aid. After stirring at 65–67° C. (10 minutes) the solid is isolated by a vacuum filtration; the filter cake is washed with 1000 parts water at 65–67° C. then with 1000 parts water at room temperature leaving an insoluble "tar cake." The mother liquors and the washes are then combined with 700 parts sodium chloride added plus 10 parts dry ethyl auramine as seed. After cooling to room temperature the precipitated ethyl auramine product is isolated by filtration and dried. 105.7 parts of dry dye product is obtained. This adjusted for the 10 parts seed product used amounts to a net dry product of 95.7 parts; this by analysis contains 94.2 parts or 62.2% theory, expressing the product as the monohydrate of the hydrochloride salt of the dye base (mol. wt. 377.5).

The basification step is carried out on the remaining tar cake from the water extraction of the original filter cake. The tar cake is washed with a mixture of 150 parts 28% aqueous ammonia in 100 parts water at room temperature, passing the wash through the cake six times over a ten minute period. Then the cake is washed with 2000 parts water at room temperature to remove alkalinity. These washes are discarded. The residual cake is then washed with 2000 parts water at 65–67° C. containing 10 parts acetic acid, cycling the wash through the cake 4 times. The cake is given a final wash with 1000 parts water at 65° C. To the combined washes are then added 300 parts of sodium chloride to salt out the product. The mixture is cooled to room temperature and the solid product isolated by filtration and dried. This secondary product contained 22.6 parts real rye or 14.9% of theory on the same basis as above.

In summary, the basification procedure provides an increase in yield of real dye of 23.9%.

|  | Parts real dye | Percent theory |
| --- | --- | --- |
| Major dye product | 94.2 | 62.2 |
| Secondary dye product | 22.6 | 14.9 |
| Total | 116.8 | 77.1 |

Thus, the increase in product yield is from 62.2% to 77.1% or 23.9%.

EXAMPLE 2

Portions of molten reaction mixture containing crude ethyl auramine, prepared as described in Example 1, were subjected to the isolation and basification process using several different alkaline wash solutions (A, B and C). Dilute acetic acid was used as the acid wash in all instances.

(A) A 98.3 part portion of molten dyemelt was drowned in 1750 parts water at 65–67° C. containing 2 parts acetic acid and 19 parts filter aid. After stirring ten minutes the solid material was isolated by filtration; the cake was washed with 250 parts water at 65–67° C. and then with 250 parts water at room temperature leaving a residual clarification or tar cake. The liquors and washing were combined and 175 parts sodium chloride with 2 parts dry ethyl auramine seed product were added. After stirring and cooling to room temperature, the total solids were isolated by filtration and dried. 23.8 parts of dry dye were obtained (25.8 parts minus 2 parts seed).

The above clarification or tar cake was further washed with a solution of 40 parts 28–30% aqua ammonia and 25 parts water, cycling the wash for 10 minutes and was then further washed with water until no longer alkaline. These washes were discarded.

The residual cake was then washed with 250 parts water at 65° C. containing 2.4 parts of acetic acid, cycling the wash four times. To the wash liquor was added 80 parts sodium chloride for precipitation of the dye forming a dye slurry. The cake was washed with an additional 250 parts water at 65° C. and this wash liquor was combined with the dye slurry. The whole slurry was then cooled to room temperature and the solid dye isolated by filtration and dried. This gave 5.8 parts of dry dye. The treated clarification cake was shown by analysis to still contain 2.3 parts real dye.

(B and C) The above process was repeated on separate batches of the dyemelt using sodium bicarbonate solution (Run B) and sodium carbonate solution (Run C) as alkaline wash materials. The results are shown in Table I.

TABLE I.—BASIFICATION PROCESS ON 98.3 PARTS MOLTEN DYEMELT

| Alkaline wash used | Acid wash used | Net weight dry dye 1st ppt. parts | Weight of dye 2nd ppt. parts— | Percent increase in yield | Weight real dye remaining in tar by assay parts |
|---|---|---|---|---|---|
| Run: | | | | | |
| A ... 25 parts water plus 40 parts 28% ammonia. | 250 parts water and 2.4 parts acetic acid. | 23.8 | 5.8 | 24.6 | 2.3 |
| B ... 450 parts water plus 29.4 parts sodium bicarbonate. | 250 parts water and 2.4 parts acetic acid. | 23.4 | 2.6 | 11.1 | 5.85 |
| C ... 275 parts water plus 18.5 parts sodium carbonate. | 250 parts water and 2.4 parts acetic acid. | 23.7 | 4.2 | 17.7 | 4.1 |

EXAMPLE 3

A series of isolations A, B and C, using a 100-part portion of molten dyemelt was performed using a procedure similar to that described in Example 2, using different alkaline agents for basification, but combining the final acetic acid wash with the hot water extract of the filter cake resulting from the drowning of the reaction mixture. Control Run D used no basification. The results are shown in Table II.

TABLE II.—BASIFICATION PROCESS ON 100 PARTS MOLTEN DYEMELT FINAL ACETIC WASH COMBINED WITH ORIGINAL AQUEOUS WASH

| Alkaline wash used | Real isolated yield parts | Real dye remaining in tar by assay parts |
|---|---|---|
| Run: | | |
| A ... Ammonia solution | 28.4 | 3.9 |
| B ... Sodium hydroxide solution | 28.4 | 1.9 |
| C ... Sodium carbonate solution | 26.8 | 5.0 |
| D ... None | 23.3 | 8.0 |

EXAMPLE 4

Entire drowned dyemelt subjected to the basification procedure

A 121.3 part portion of the ethyl auramine molten dyemelt (reaction mixture) was charged to 2000 parts water at 65° C. containing 25 parts filter aid; after stirring ten minutes, 330 parts water containing 6.75 parts sodium hydroxide was added. After stirring for a short time at 65° C. the pH was determined to be 10.1.

The solid was then isolated by filtration and the cake was washed free of caustic, discarding the wash.

The cake was then washed with 3000 parts water at 65° C., adjusting the pH to 3.4 with acetic acid. After one pass through the cake, the pH of the wash was adjusted to 4.4 with acetic acid and the wash was then cycled through the cake two more times. The final pH was 4.5. The cake was given a final wash with 600 parts of water at 65° C.

To the combined washes, 370 parts of sodium chloride was added; the mixture was then cooled to room temperature and the precipitated dye was isolated by filtration and dried, giving 28 parts of dye. Analysis showed only 0.6 part real dye remaining in the cake.

While the present invention has been described herein in terms of specific examples and embodiments thereof, it is not intended that the scope of the invention be limited thereby, but only as defined in the following claims.

I claim:

1. In the process for the preparation of ethyl auramine which comprises reacting tetraethyldiaminodiphenylmethane with sulfur and ammonia in the presence of urea, the improvement which comprises treating the molten reaction mixture by (1) drowning with water, (2) filtering the drowning mixture, (3) extracting the filter cake resulting from step 2 with hot water, (4) recovering ethyl auramine from the extract of step 3 by salting out and filtration, (5) treating the filter cake resulting from step 3 with an aqueous alkaline solution having a pH of at least 10, (6) extracting the filter cake with an aqueous acid solution and (7) isolating the ethyl auramine from the acid extract by salting out and filtration.

2. The process of claim 1 wherein the aqueous alkaline solution is aqueous ammonia.

3. The process of claim 1 wherein the aqueous alkaline solution is sodium carbonate.

4. The process of claim 1 wherein the aqueous alkaline solution is sodium hydroxide.

5. The process of claim 1 wherein the aqueous acid solution is acetic acid.

6. In the process for the preparation of ethyl auramine which comprises reacting tetraethyldiaminodiphenylmethane with sulfur and ammonia in the presence of urea, the improvement which comprises treating the molten reaction mixture by (1) drowning with water, (2) filtering the drowning mixture, (3) treating the filter cake resulting from step 2 with an aqueous alkaline solution having a pH of at least 10, (4) extracting the filter cake with an aqueous acid solution and (5) isolating the ethylauramine from the acid extract by salting out and filtration.

7. In the process for the preparation of ethyl auramine which comprises reacting tetraethyldiaminodiphenylmethane with sulfur and ammonia in the presence of urea, the improvement which comprises treating the molten reaction mixture by (1) drowning with an aqueous alkaline solution having a pH of at least 10, (2) filtering the drowning mixture, (3) extracting the filter cake resulting from step 2 with an aqueous acid solution and (4) isolating the ethylauramine from the acid extract by salting out and filtration.

8. In the process for the preparation of ethyl auramine which comprises reacting tetraethyldiaminodiphenylmethane with sulfur and ammonia in the presence of urea, the improvement which comprises treating the molten reaction mixture by (1) drowning with water, (2) filtering the drowning mixture, (3) extracting the filter cake resulting from step 2 with hot water, (4) treating the filter cake with an aqueous alkaline solution having a pH of at least 10, (5) extracting the filter cake with an aqueous acid solution, (6) combining the extracts from steps 3 and 5 and (7) isolating the ethylauramine from the combined extracts by salting out and filtration.

References Cited

UNITED STATES PATENTS

| | | | |
|---|---|---|---|
| 2,055,685 | 9/1936 | Flett | 260—566 |
| 3,132,178 | 5/1964 | Weyker et al. | 260—566 |
| 3,209,027 | 9/1965 | Grosklos | 260—566 |
| 3,268,585 | 8/1966 | Grosklos | 260—566 |
| 3,373,199 | 3/1968 | Cohen et al. | 260—566 |

ROBERT V. HINES, Primary Examiner

U.S. Cl. X.R.

260—248, 570